US005808613A

United States Patent [19]

Marrin et al.

[11] Patent Number: 5,808,613
[45] Date of Patent: Sep. 15, 1998

[54] NETWORK NAVIGATOR WITH ENHANCED NAVIGATIONAL ABILITIES

[75] Inventors: Christopher F. Marrin, Fremont; Richard Carey, Los Altos; Robert K. Myers, Santa Cruz, all of Calif.

[73] Assignee: Silicon Graphics, Inc., Mountain View, Calif.

[21] Appl. No.: 654,297

[22] Filed: May 28, 1996

[51] Int. Cl.[6] .................................................. G06F 3/00
[52] U.S. Cl. .......................... 345/355; 345/357; 345/427; 707/501
[58] Field of Search ..................................... 345/339, 348, 345/354, 355, 356, 357, 419, 427; 707/501

[56] References Cited

U.S. PATENT DOCUMENTS

| 5,276,785 | 1/1994 | Mackinlay et al. | 395/127 |
|---|---|---|---|
| 5,347,306 | 9/1994 | Nitta | 345/302 |
| 5,359,703 | 10/1994 | Robertson et al. | 345/419 |
| 5,491,743 | 2/1996 | Shiio et al. | 345/332 |
| 5,572,248 | 11/1996 | Allen et al. | 345/329 |
| 5,590,268 | 12/1996 | Doi et al. | 345/326 |

OTHER PUBLICATIONS

Balaguer, J.–F. et al., "A High–Speed 3D Web Browser," Center for Advanced Studies, Research and Development in Sardinia, Cagliari, Sardinia, (date unknown).

Bengt–Olaf, S. et al., "BRUSH As A Walkthrough System For Architectural Models," IBM T.J. Watson Research Center, Yorktown Heights, New York, (date unknown).

Mohageg M. et al., "A User Interface For Accessing 3D Content On The World Wide Web," Silicon Graphics, Inc., Mountain View, California, (not published).

Primary Examiner—Raymond J. Bayerl
Assistant Examiner—Cao H. Nguyen
Attorney, Agent, or Firm—Sterne, Kessler, Goldstein & Fox P.L.L.C.

[57] ABSTRACT

A browser for allowing a user to navigate in a three-dimensional world having a plurality of objects provides enhanced navigational capabilities. The browser allows the user to seek to an object or location in the world, navigate throughout the world using cursor inputs and select an object to follow links associated with that object. The browser differentiates between a seek command, a select command and a travel command entered by the user via a pointing device to provide the three navigational capabilities without requiring the user to change a navigational mode of the browser. A traveler viewer allows the user to travel throughout the three-dimensional world using pointing device inputs such as single click inputs, double click inputs and click and drag inputs. An examiner viewer allows the user to examine a three-dimensional object by rotating the object, zooming in and out on the object, translating the object in the x and y direction and following links associated with the object or a portion thereof.

39 Claims, 10 Drawing Sheets

NETWORK NAVIGATOR WITH ENHANCED NAVIGATIONAL ABILITIES

BACKGROUND OF THE INVENTION

1. Field of the Invention

This invention relates generally to network navigators and more specifically to a navigator having enhanced navigational abilities.

2. Related Art

As the computer revolution is sweeping all aspects of business and industry as well as the personal consumer market, the Internet is experiencing widespread growth. A fundamental structure of the Internet is the World-Wide Web (WWW). The world-wide web was created by the Counseil Europeen pour la Recherche Nucleaire (CERN) in Switzerland to facilitate the use of computers in research efforts and information exchange.

The world-wide web uses hypertext markup language (HTML) that provides links to documents and data anywhere in the world. These links are referred to as hypertext links or hypertext pointers. Through hypertext, a user simply clicks on a word, phrase or image and the files or data associated with the clicked object are retrieved. The mouse click activates a hypertext marker that contains instructions pointing to the data. Thus, through the use of hypertext, the user can navigate interactively across the network with little concern regarding where the accessed information is located.

The newest class of navigation tools available for network browsers, including browsers on the world-wide web, are 3D navigation tools. The increased availability of 3D graphics workstations capable of providing high-resolution 3D scenes at interactive speeds has enhanced the viability of 3D browsers. In fact there are already several first-generation 3D browsers available on the market. However, these browsers have some shortcomings in the way they force users to navigate throughout a network.

SUMMARY OF THE INVENTION

The present invention is directed toward a navigator having enhanced navigational abilities such as cursor-navigation and hierarchical object seeking abilities. The present invention can provide two types of viewers to the user: a walk, or traveler, viewer and an examiner viewer. The walk viewer allows the user to navigate around in the three-dimensional world by traveling through the world (e.g., as if walking through the world). The examiner viewer allows the user to examine an object in the world by rotating that object and translating the object in the x, y, and z directions.

The walk viewer provides a control panel navigational mode and an enhanced navigational mode. The enhanced navigational mode is referred to as the cursor-navigation mode. In this cursor navigation mode, the user navigates throughout the world without relying on controls found in the control panel. In the cursor-navigation mode, the user uses mouse clicks and click-and-drag operations to navigate in the world.

In the cursor-navigation mode, if the user wishes to advance to, or seek to, an object, the user single-clicks on that object. If the user wishes to navigate through the world, the user clicks and holds a designated mouse button (or other pointing device actuator) and drags the cursors in the direction the user wishes to travel. The viewer follows the user's cursor movements. If the user wishes to select an object to follow its link, the user simply double-clicks on the object.

To distinguish the difference between a seek command, a travel command and an object selection command, the navigator distinguishes between a single click, a click and drag and a double click. It is recognized that alternative commands (other than single click, click-and-drag and double click) could be used to implement the seek, travel and select options. Also, pointing devices other than a mouse could be implemented as well.

If a seek command is entered, the navigator moves the position of the user's viewpoint in response to that seek command. If the user clicks on an object in the three-dimensional world, the navigator brings the user to that object. If the user clicks on a location in the world (but not necessarily on an object), the navigator brings the user to that location.

The navigator to utilizes a plurality of hierarchical levels in objects to provide an enhanced seeking mode. Where utilized, the enhanced seek feature seeks to an object selected by the user. If the object is selected a second time, the seek functionality invoked depends on whether there is a lower level of hierarchy. If there is a lower level of hierarchy, the navigator seeks to that next lower level. If there is no lower level of hierarchy, the navigator seeks closer to the object.

If the user selects an object by entering a select command (e.g., by double-clicking on that object), the navigator follows the one or more links associated with that object to retrieve the associated data. In one embodiment, if the user is not at the object, the select mode also seeks to the object while activating the associated link.

If the user enters the walk mode, the browser changes the user's viewpoint, or the location of the user, in response to cursor movements on the screen. For example, if the user drags the cursor left, the navigator causes the user's viewpoint to move as if the user is walking to the left. Right cursor motion causes the user to walk to the right. Up and down cursor motion cause the user to walk forward and backward.

An examiner viewer allows users to a examine three-dimensional object and to follow links associated with the object or a component thereof. In a preferred embodiment, a trackball is provided on a virtual control panel that allows the user to rotate the object in accordance with trackball inputs. The user can zoom in and out on the object and select the object or portions of the object to follow associated links. The user can also translate the object (or slide the user's viewpoint) in the x and y directions. Thus, the examiner viewer provides capabilities for a full examination of a three-dimensional object.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

1. Overview and Discussion of the Invention

The present invention is directed toward a 3D navigation tool that allows a user to browse a network such as the world-wide web using a three-dimensional world. According to the invention, enhanced navigational capabilities are provided that allow the user to travel throughout the three-dimensional world, seek objects in the world and select objects and their associated virtual reality modeling language (VRML) links. The portion of the browser that provides the enhanced navigational abilities is referred to as a traveler viewer. This portion is also sometimes referred to as a walk viewer, in that use of the viewer makes it appear as if the user is actually walking around in the three-dimensional world.

Also disclosed is an examiner viewer which allows the user to examine a three-dimensional object by rotating the object, zooming in and out on the object and translating the object in the x and y directions. The user can also select the object or portions of the object that have associated VRML links and follow those links to retrieve the associated data.

The manner in which the traveler viewer and the examiner viewer are implemented is described in detail below according to several embodiments.

2. 3D Navigators

A 3D navigator allows a user to browse a network such as the world-wide web using a 3D world having objects that identify available sites. The 3D world is generally created in VRML. Virtual reality modeling language is an open, platform-independent file format based largely on the Silicon Graphics Open Inventor™ file format.

One advantage of well-designed 3D navigators is that no special experience or training is needed to navigate in the available worlds. In other words, well-designed 3D navigators are user friendly and typically work in conjunction with HTML browsers, such as Netscape Navigator® or Mosaic®.

The navigator provides a view of a 3D world from the virtual position of a virtual observer. Input controls are provided that allow the observer to move about in the 3D world. In this document, the observer and movement are described in terms of a "camera" and in terms of moving the camera within the world. The movement is also described in terms of a user's "viewpoint" and in terms of changing the user's viewpoint.

3. WebSpace 1.0 Navigation Tool

One conventional navigation tool available from Silicon Graphics, Inc. in Mountain View California, U.S.A., is the WebSpace Navigator, version 1.0. This tool allows users to navigate in a 3D world to select objects that contain hyperlinks to data sources.

Figure 1:
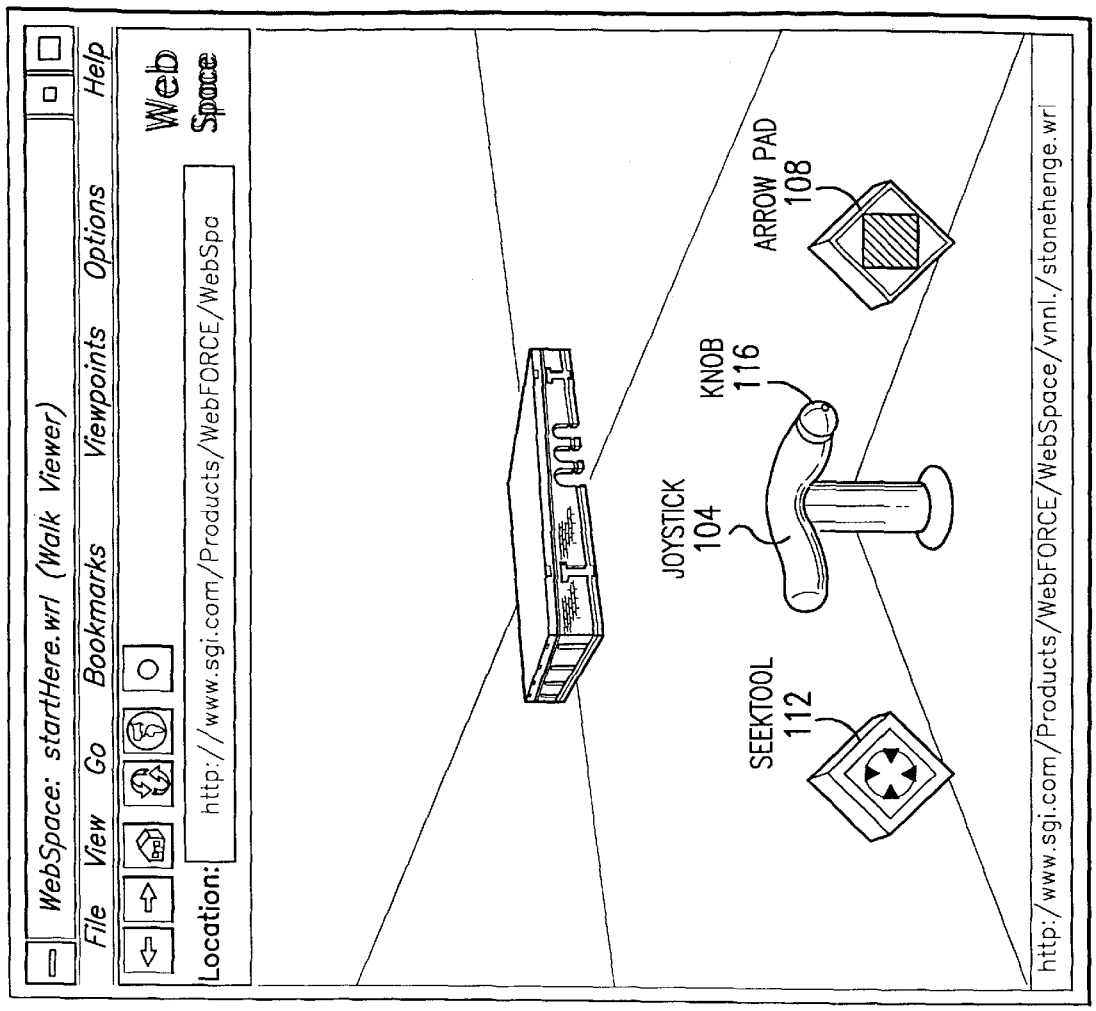
FIG. 1 is a diagram illustrating a screen view of Web-Space version 1.0 Navigator.

FIG. 1 is a screen diagram illustrating an example view of a world and a control panel 102 in a WebSpace 1.0 navigator. WebSpace 1.0 provides viewers users with a virtual control panel 102 comprising a joystick 104, an arrow pad 108, a seek tool 112 and a tilt knob 116. The joystick 104 allows users to walk around in the 3D world, controlling forward, backward, left and right motion. Moving joystick 104 left or right turns the camera left or right without moving. Tilt knob 116 is attached to the right side of the joystick. Tilt knob 116 provides tilt and turn control for the camera.

Arrow pad 108 provides height and sideling control. Height is the position of the camera in the y-axis and refers to vertical, or up/down positioning. Sideling controls the horizontal position of the camera along the x-axis. Clicking a corner of arrow pad 108 causes the user's viewpoint (i.e., the camera) to slide in the corresponding direction. For example, clicking the top of arrow pad 108 causes the user's viewpoint to slide up along the y-axis.

Seek tool 112 toggles the navigator between two modes: seek mode and standard mode. Standard mode allows the user to pan and move the camera around the world to control navigation within the world. Such control is achieved using joystick 104, arrow pad 108 and tilt knob 112. Seek mode allows a user to select an object (by clicking on it) in the world and automatically navigate to the selected object. In seek mode, once an object is selected, there is no need to use the controls to navigate to that object. Instead, navigation is done automatically.

4. Enhanced Navigation Tool

Figure 2:
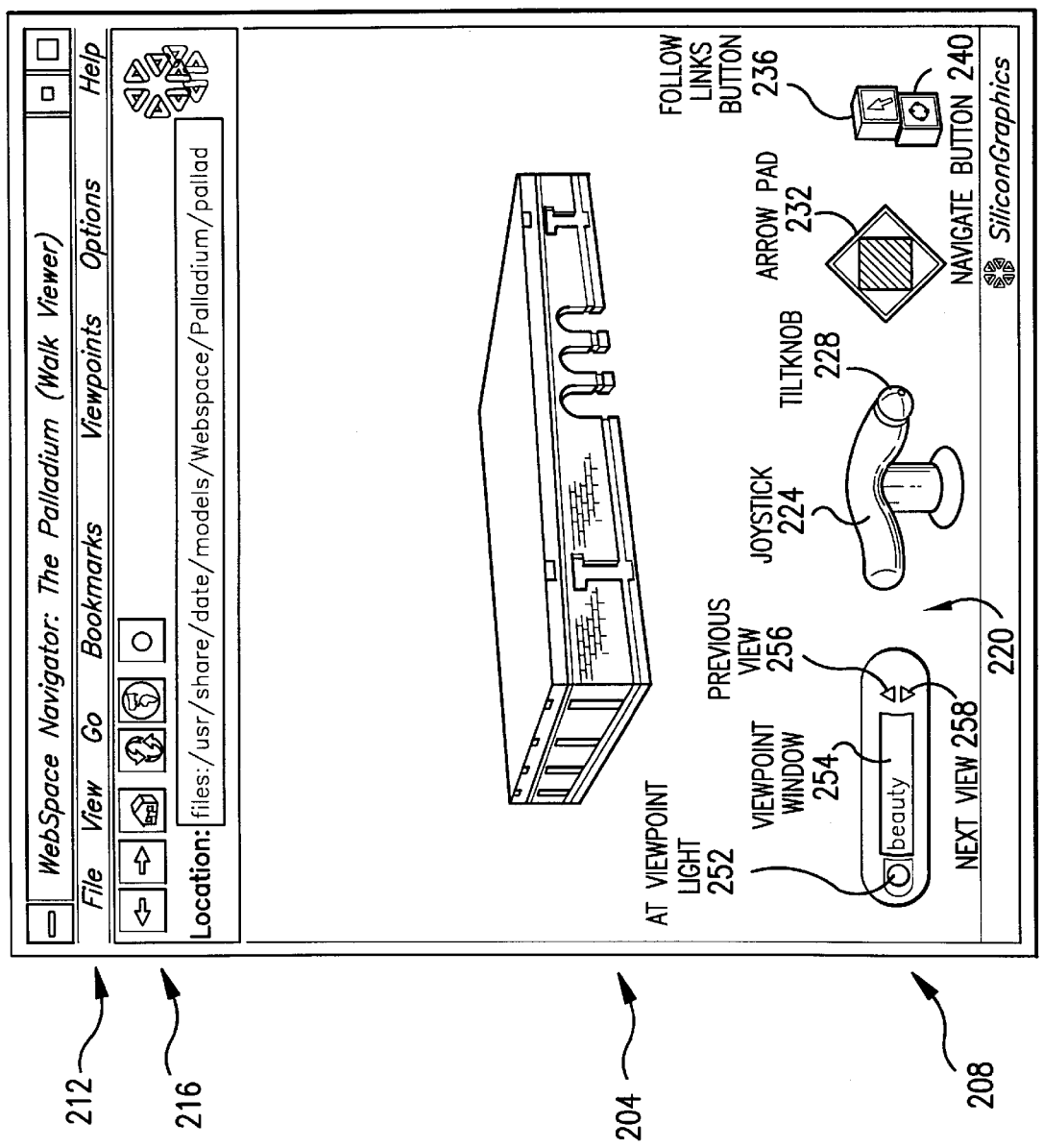
FIG. 2 is a diagram illustrating a screen view of navigator having enhanced navigational capabilities.

The latest version of the WebSpace navigator incorporates many of the features of the 1.0 version navigator and also includes some updated features as well. FIG. 2 is a screen diagram illustrating a WebSpace navigator window 200. In the embodiment illustrated in window 200 comprises a display area 204, a control panel 208 a pull-down menu bar 212 and a tool bar 216.

Display area 204 is the area of window 200 in which the 3D world is displayed from the perspective of the camera (i.e., the viewer's current virtual position in the 3D world).

Control panel 208, in this embodiment, is an on-screen virtual control bar that is operated through the use of a pointing device such as a mouse, trackball, or other input peripheral. Control panel 208 includes the controls used to navigate in the 3D world. In the embodiment illustrated in FIG. 2, controls include a viewpoint control bar 220, a joystick 224, a tilt knob 228, an arrow pad 232 a follow links button 236 and a navigate button 240.

Viewpoint control bar 220 allows the user to view a world from a number of different viewpoints. To capitalize fully on the functionality provided by viewpoint control bar 220, the creator of the scene sets up a series of standard viewpoints to guide the user through the scene. For example there can be an entry viewpoint which the creator considers as the entrance view of the world. Other standard or preferred viewpoints can be defined such as entrances to buildings in the world or views of particular objects, groups of objects or locations in the world.

Figure 3:
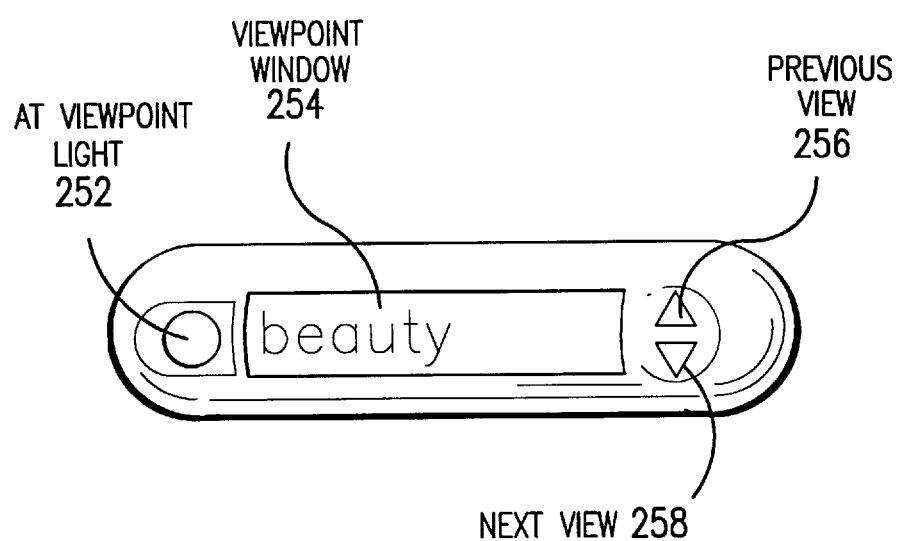
FIG. 3 is a diagram illustrating a viewpoint control bar according to one embodiment of the invention.

One embodiment of viewpoint control bar 220 is illustrated in detail in FIG. 3. Referring now to FIG. 3, this embodiment of viewpoint control bar 220 comprises a viewpoint indicator 252 (also referred to as "at viewpoint light" 252), a viewpoint window 254, and previous view 256 and next view 258 buttons.

In the embodiment illustrated in FIG. 3, viewpoint window 254 appears on control bar 220. In one embodiment, viewpoint window 254 shows the last viewpoint visited by the user. In one embodiment, viewpoint window 254 shows the last viewpoint visited by the user as a result of the user selecting that viewpoint using viewpoint control bar 220. In an alternative embodiment, viewpoint window 254 shows the last viewpoint visited by the user regardless of how the user arrived at that last viewpoint (e.g., via seeking, navigation, or selection using viewpoint control bar 220).

When the user first enters the navigator, the user is in an entry viewpoint for the current world. Clicking on viewpoint window 254 provides a list of available viewpoints to the user. The user can drag the cursor or click on a viewpoint name to select an available view. Once selected the navigator proceeds to this viewpoint.

Viewpoint indicator 252 glows brightly when the user is at a selected viewpoint. Viewpoint indicator 252 begins to dim when the user moves away from the selected viewpoint. Clicking at the viewpoint indicator 252 returns the navigator to the last viewpoint visited.

Previous view button 256 and next view button 258 allow the user to cycle through the various viewpoints.

It is important to note the distinctions and similarities between the various uses of the term viewpoint in this document. In terms of cursor navigation (described below), viewpoint is used to describe the camera position or the view that the user has of the world. This is often described in terms of the user's viewpoint. In terms of viewpoint control bar 220, viewpoint also describes the user's view of the world, but there are certain pre-defined (or, in one embodiment, user-defined, or both) "viewpoints" that can be accessed directly through selections on viewpoint control bar 220.

In one embodiment of the WebSpace navigator, two viewers are available to the user: a walk viewer and an examiner viewer. Walk viewer, also referred to as a traveler viewer, allows the user to navigate in a world by traveling through the world (referred to as walking through the world). The walk viewer is useful where the world is presented as a building or a city that the user tours to select objects. The user may use the walk viewer to travel in the city or enter buildings and to move around and among the objects in the world.

The examiner viewer allows the user to examine an object in the world by rotating that object, and moving the object in the x, y and z directions. Preferably in the examiner viewer, the user manipulates the object while the user remains stationary.

In most applications, the type of viewer set up as the default viewer for the world is specified by the author of that world. However, a feature is provided enabling the user to select a preferred viewer. In one embodiment this is accomplished via the view pull-down menu in menu bar 212. A tool button for the views can also be provided in tool bar 216.

In one embodiment, when the file is saved the default viewer is saved with the file even if the user selected a different viewer. In this embodiment, when the file is later opened, it is again opened with the default viewer.

Walking around a world can be accomplished using the virtual control panel controls or by using the cursor. Joystick 224 allows the user to walk around in the world by moving forward, backward, left and right. Moving joystick 224 to the left or the right causes the camera to turn in the corresponding direction. In one embodiment, joystick 224 is interactive. That is, its position on the screen changes as the user drags it forward, backward, left and right.

4.1 Navigation Using Control Panel Controls

One example embodiment of how a user navigates through the world using joystick 224 is now described. In this embodiment, the user first selects the walk viewer from the view menu if the walk viewer is not already selected or if the walk viewer is not the default viewer. The user then clicks on joystick 224 and drags the cursor to move throughout the world. In one embodiment, this action results in the cursor changing to appear as a hand. Dragging the cursor up on the screen moves the user forward through the world and dragging it down on the screen moves the user backward. Similarly, dragging the cursor left or right moves the user left or right in the world.

If the movement resulting from dragging the cursor is too fast or too slow, in one embodiment the user can change the speed using the view menu in pull down menu 212.

Tilt knob 228 allows the user to tilt the camera up, down, left, or right while the user remains stationary in his or her current position in the world. In this manner, the tilt knob allows the user to look up, down, left, or right in the scene without moving. For example, if the user is currently in a building, the tilt knob allows the user to look at the ceiling or floor of the building or allows the user to look to the left or the right in the building.

Operation of tilt knob 228 is similar to that of joystick 224. To operate tilt knob 228, the user clicks on tilt knob 228 and drags the cursor up, down, left, or right to invoke the desired action.

Arrow pad 232 allows the user to control the position of the camera along the x and y axis without tilting or turning the camera. This is accomplished by clicking on arrow pad 232 to select it, and then dragging the cursor. Dragging the cursor up or down selects a camera position on the y axis, while dragging the cursor left or right selects a position on the horizontal or x axis. In other words, this results in the camera being 'slid' in a direction corresponding to the cursor movement.

Thus, using joystick 224, tilt knob 228 and arrow pad 232, the user can navigate through the scene by clicking on a control and dragging the cursor in the desired direction of movement. In the embodiment described above, these controls function similar to those found on WebSpace browser version 1.0.

4.2 Cursor Navigation Mode

In one embodiment, an alternative mode is available that allows the user to navigate throughout the world without relying on the controls found in control panel 208. This is referred to as the cursor-navigation mode. In the cursor-navigation mode, the user simply uses click or click-and-drag functions of the pointing device to navigate throughout the world.

This mode can be the default mode of the navigator, or it can be entered by the user clicking on navigate button 240. Alternatively, the user could select this cursor-navigation mode by choosing it from the options menu in pull-down menu 212.

Described in simplest terms, a single-click on a target in the world moves the user to that target. A click-and-hold allows the user to drag the cursor around the world, causing the user to move throughout the world in conjunction with the cursor drags. Finally, a double-click selects the object and invokes the link associated with the object on which the user double clicked.

In the cursor-navigation mode, to operate a single-click seek, the user simply places the cursor over the target to which he or she wishes to move and clicks on that target. The user is automatically brought to the selected target. In one embodiment, this can be accomplished in two different ways. The system can travel to the target moving along a path between the user's current position and the selected destination. Alternatively, the user can select to jump directly to the target instead of traveling through the world along a path to arrive at the target. The end result is the same, but the look and feel of the process to arrive at that end result is different.

Figure 4:
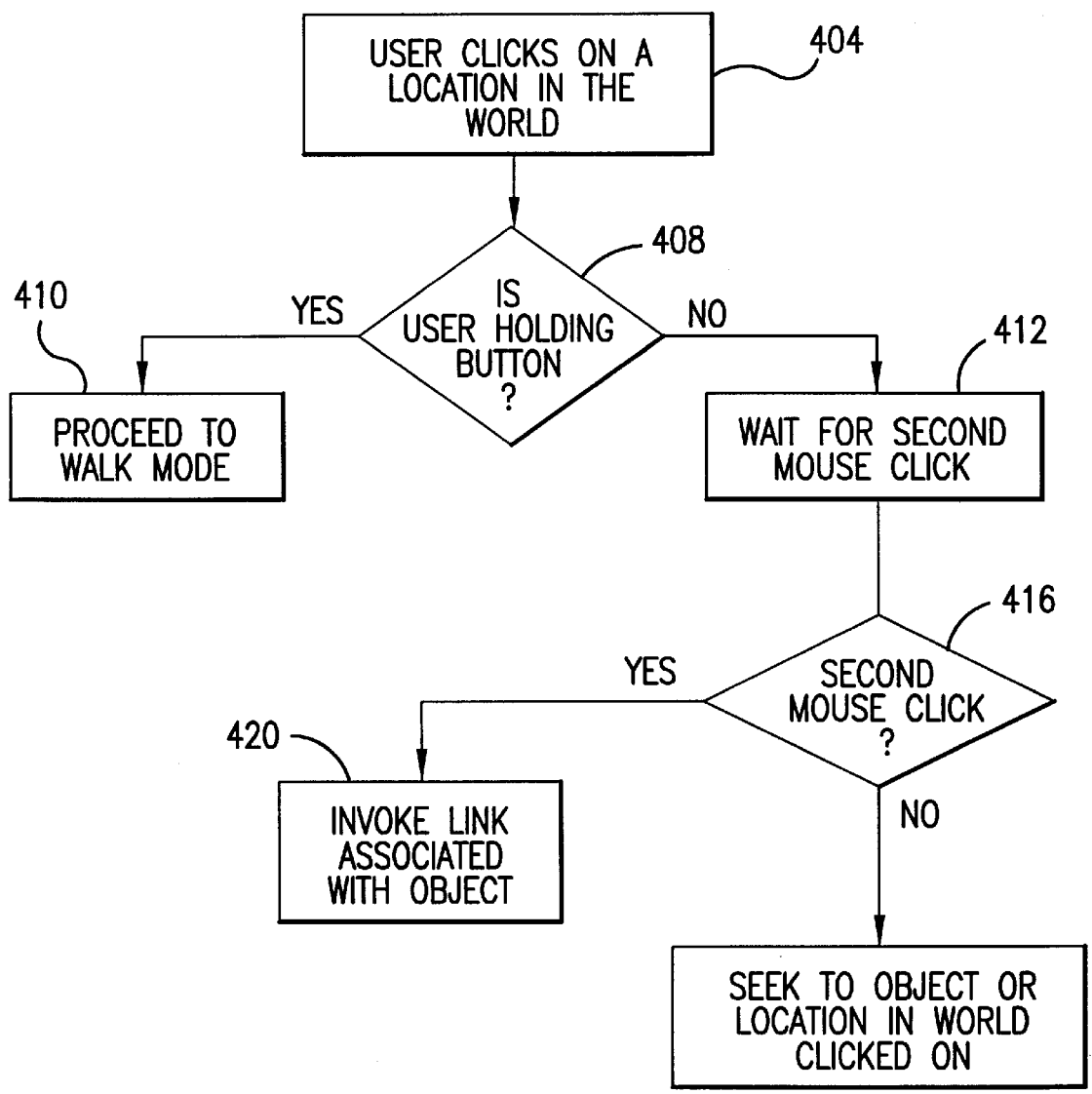
FIG. 4 is a diagram illustrating a process by which the navigator discerns inputs received by the user according to one embodiment of the invention.

A process by which this cursor-navigation mode operates is now described in more detail with reference to FIG. 4. The process is described in terms of using a mouse as an input peripheral for navigational control. In a step 404, the user positions the cursor on the screen and clicks an appropriate mouse button (generally the left mouse button). If the user wishes to jump to an object or a particular position in the world (i.e., to seek an object), the user places the cursor at that position and enters a single click on the appropriate mouse button.

As stated above, if the user holds the mouse button down, the user can drag the cursor to move throughout the world. Thus, to properly interpret the user's actions, the navigator interprets the mouse clicks as either single-clicks, double-clicks or click-and-drag operations as described below with reference to steps 408 through 424.

In a step 408, the system determines whether the user has made a single mouse click or whether the user is holding the mouse button. This is typically accomplished by determining the length of time during which the button is depressed. If the button is depressed for more than a default or predetermined period of time, it is determined that the user is holding the mouse button (i.e., it is determined that this is a click-and-drag operation). In this event, the operation continues at a step 410, where the navigator enters the walk mode. In one embodiment, the length of time established for the default can be selected by the user in an options or preferences screen.

Once in this walk mode in step 410, the navigator responds to the cursor movements by navigating throughout the world in accordance with the user's inputs. As long as the button is depressed, dragging the cursor left, right, up or down causes the navigator to move through the world in the left, right, forward or backward direction, respectively.

This embodiment, allowing, forward backward, right and left motion simulates walking throughout the world in a single plane. Changing planes requires the user to press arrow pad 208 or enter a keystroke to translate his or her position up or down. Alternative embodiments allow the cursor to be used as a joystick, where up and down cursor movements control the up and down motion of the user's viewpoint, similar to flying a plane. In this alternative embodiment, forward and backward motion can be controlled by keyboard or other device inputs. Thus, the traveler viewer is not limited to motion that emulates single plane motion such as walking (or driving) throughout the world, the traveler viewer can also emulate flying throughout the world as well.

If in step 410 it is determined that the mouse button is not held down, the navigator waits a predetermined period of time for the occurrence of a second mouse click. This is illustrated by step 412 and decision step 416.

If the second mouse click does not occur within a predetermined period of time, the operation continues at a step 424 where the navigator brings the user to the point in the world on which the user single clicked. This is referred to as the seek mode. As stated above, this can be done by moving the user through the world to the designated point, or by jumping it directly to that point. The manner in which the navigator navigates to a selected point according to one or more embodiments is described in more detail below.

If, on the other hand, a second mouse click is received within the predetermined period of time, this series of clicks is interpreted as a double click, causing the link associated with the object to be invoked. This is illustrated by a step 420.

This mode of navigation is a distinct advantage, in that it allows the user to perform any of three operations using simple point-and-click actions. Special modes do not need to be invoked to toggle from one action-type, or mode, to the next. The user can single click to move to a target (i.e., seek a target), click and drag to move around within the three-dimensional world, or double-click to invoke a point associated with an object. The user need not make any further actions to move from one of these modes to the next.

In the embodiment described above, the cursor-navigation mode is invoked by clicking navigate button 240. In an alternative embodiment, follow links button 236 and navigate button 240 are not provided. In this embodiment, the cursor-navigation mode is selected as a standard or default mode of operation. There is no need to select the navigate button 240 to enter this mode. Alternatively, toggling between the cursor-navigation mode and alternative modes can be done using menu controls via pull-down menu 212. Numerous other alternative embodiments are contemplated for allowing the user to select the cursor-navigation mode as the desired navigational mode.

In the embodiment where follow links button 236 and navigate button 240 are provided, the cursor-navigation mode described above is entered by clicking navigate button 240. Selection of follow links button 236 allows the user to follow a link from a highlighted object (the VRML analogue of an HTML hypertext link) to follow the link associated with that object. Thus, in this mode, single clicks can be used to follow links associated with certain objects.

According to one embodiment of the invention, the user can string several single clicks together to continue moving throughout the world in the seek mode. In other words, the user can make a single click, begin moving toward that location, and enter another single click elsewhere to continue moving through (or near) the first location to the second selected location, and so on. To enhance navigation in this scenario, the navigator recognizes when the user is single clicking while already moving.

To eliminate jerkiness in this continuous-motion scenario, the intermediate stops at previously selected locations can be bypassed. That is the acceleration and deceleration resulting from moving to stopped to moving can be bypassed.

4.3 Adaptive Seek

According to one embodiment of the invention, an adaptive scheme is provided to allow the navigator to seek objects. To implement this scheme, a hierarchical object structure of objects in the world is capitalized. This hierarchical structure allows the navigator to seek an object using a refined process, which is now described.

Figure 5:
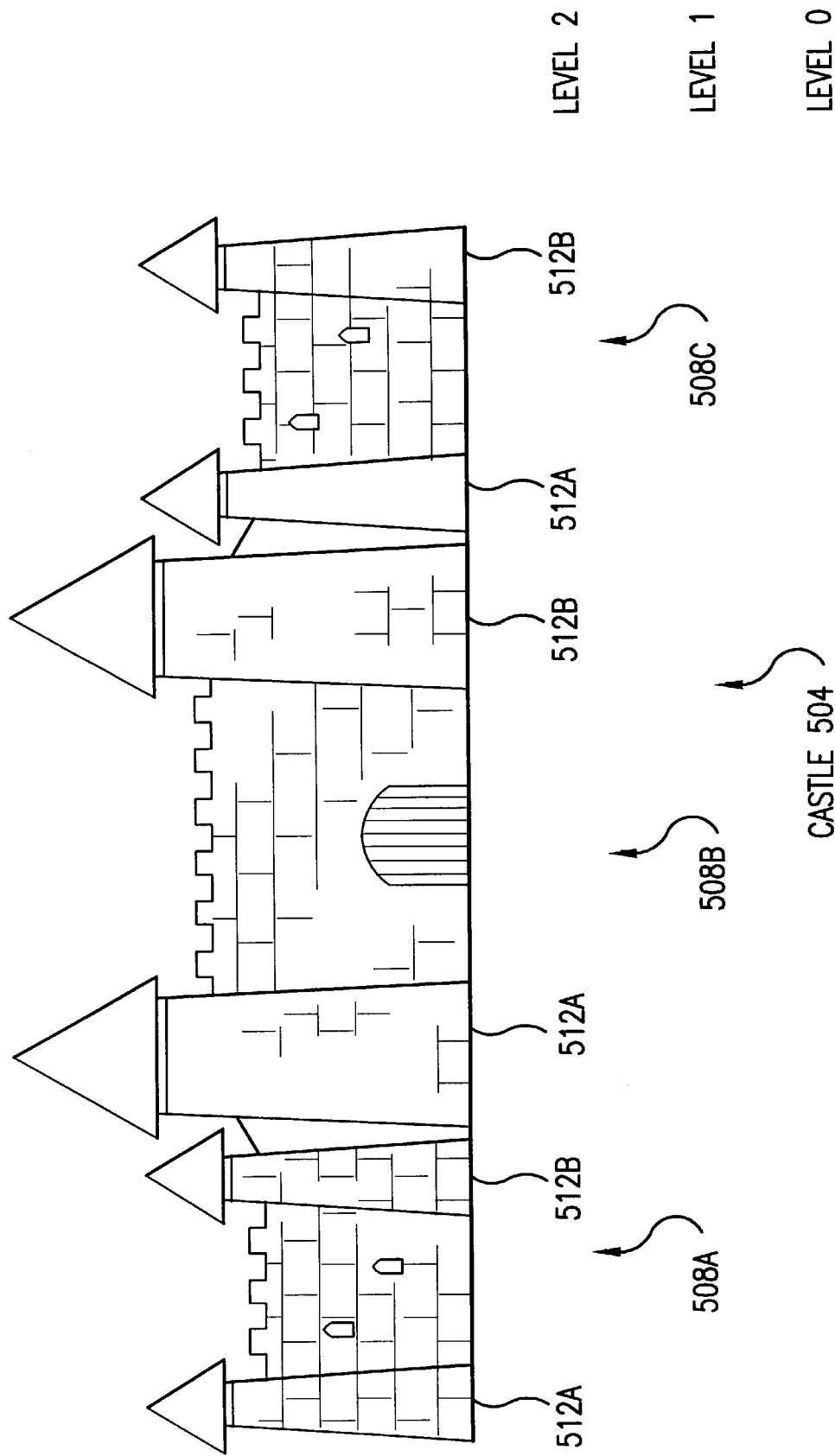
FIG. 5 is a diagram illustrating a castle as an example object in a world.

According to this hierarchical structure, each object in the world can have several levels of hierarchy. FIG. 5 is a screen diagram illustrating an example object having three levels of hierarchy. In this example, the object is a castle 504. Castle 504 is comprised of three wings 508A, 508B, 508C and each wing 508 is comprised of two spires 512A, 512B.

The highest level of hierarchy is the castle 504 itself, including wings 508 and spires 512. The next level of hierarchy is the three wings 508A, 508B, 508C. The last level of hierarchy found in castle 504 is spires 512A, 512B.

Figure 6:
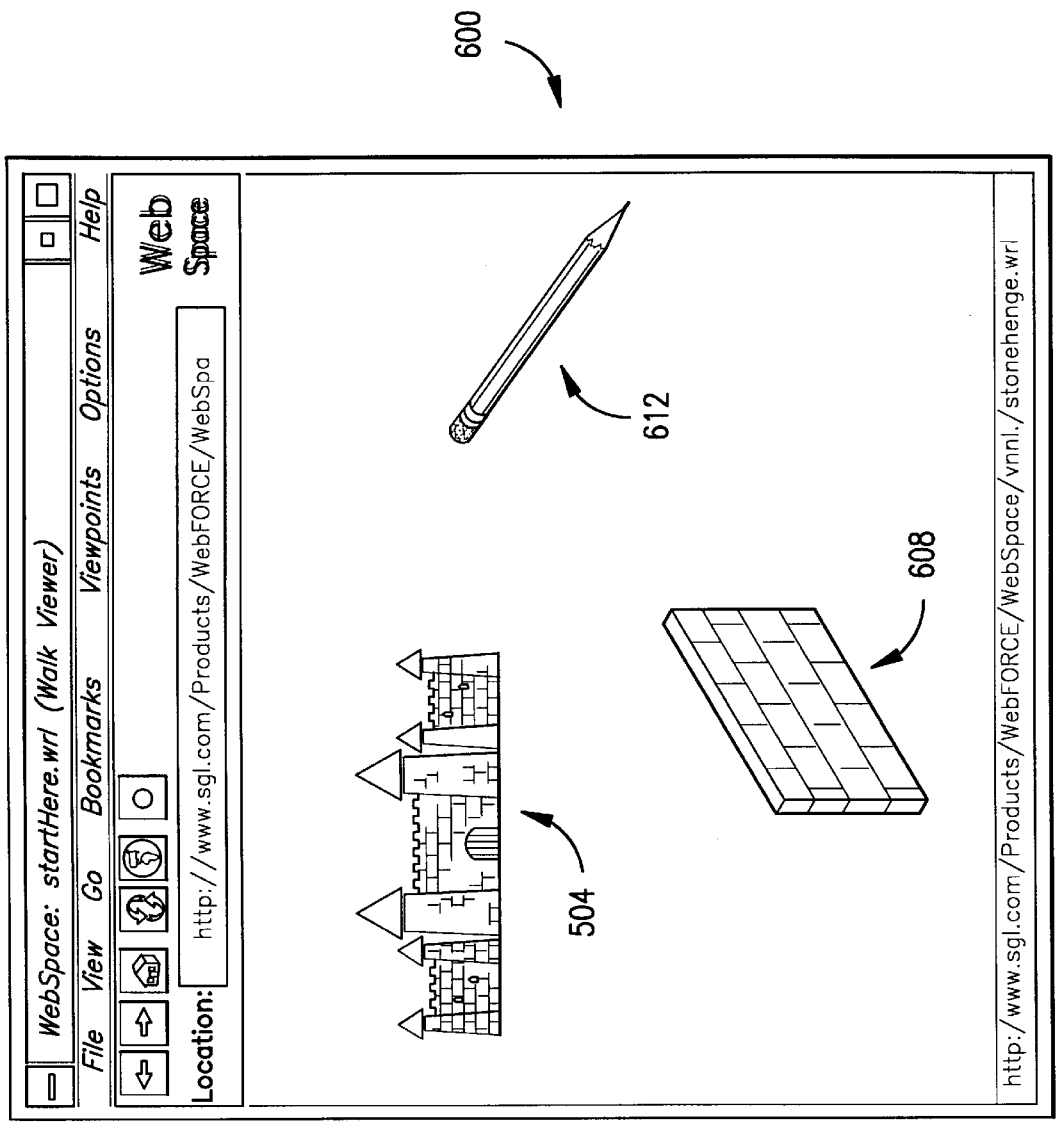
FIG. 6 is a diagram illustrating a screen view of a world having three objects.

FIG. 6 is a screen diagram illustrating a view of a world having three objects: castle 504, wall 608 and a pencil 612. When viewed at this distance as illustrated in FIG. 6, castle 504 appears as a single object at the highest level of hierarchy (e.g., at level zero). As the user moves closer to castle 504 the lower levels of hierarchy (e.g., levels one, two, etc.) begin to appear as distinguishable components of the object.

In one embodiment depending on the configuration chosen, these levels of hierarchy may become distinguishable at a predetermined distance. In one embodiment, the distance is chosen as the distance at which the object can be readily distinguished by a human eye on a computer screen or, alternatively the distance at which the detail of a given level of hierarchy can be adequately rendered on the machine. For example, in one embodiment, the next lowest level of hierarchy becomes distinguishable when the object at that level is 75% of the screen.

The adaptive seek feature of the navigator can be used in conjunction with the hierarchical structure of objects in the 3D world. In one embodiment, the adaptive seek feature seeks to an object selected by the user. In one embodiment, if the object is selected a second time, the seek function depends on whether there is a lower level of hierarchy. If there is a lower level of hierarchy, the navigator seeks to that next lower level. If there is no lower level of hierarchy, the navigator seeks closer to the object. In one embodiment, where the navigator seeks closer to the object at the same level of hierarchy, the user can select a portion of the object on which to center the seek.

Figure 7:
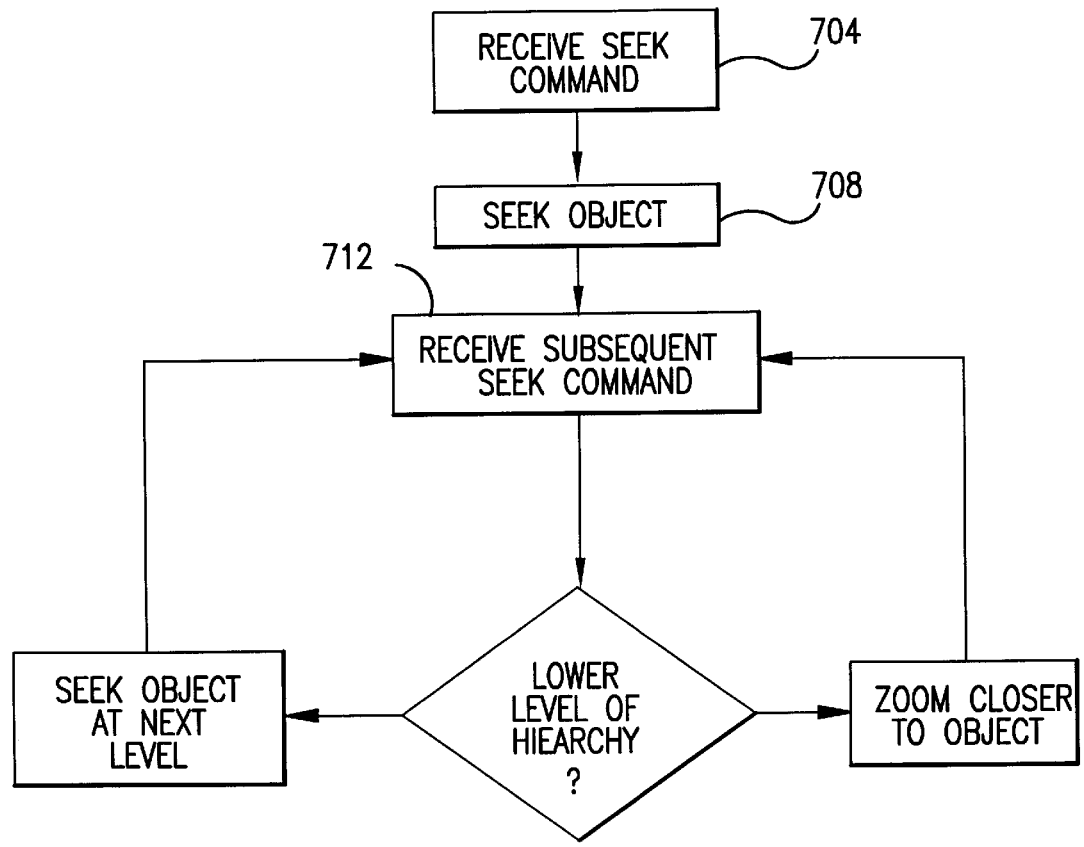
FIG. 7 is a flow diagram illustrating one process by which the navigator seeks objects in a hierarchical embodiment.

FIG. 7 is a process flow diagram illustrating a process by which the navigator seeks to an object in a hierarchical system according to one embodiment of the invention. In a step 704, the navigator receives a seek command to seek to an object. For example, the command may tell the navigator to seek to an object such as castle 504. In one embodiment, the seek command is input by the user and recognized by the navigator as described above with reference to FIG. 4.

In a step 708, the navigator seeks the indicated object. In one embodiment, navigator zooms to the selected object (smoothly or in a jump mode) so that the object covers 75% of the screen. In other embodiments, the navigator zooms to the object such that it covers a different percentage of the screen. Preferably the object is placed such that at least the next lowest hierarchical level of the object is discernable or distinguishable.

If no subsequent seek command is entered for that object, the seek operation is completed. The user may continue navigating, enter another seek command, or select the object to follow its VRML link.

If the user enters another seek command for the object as illustrated by step 712, the navigator first determines whether there is a lower level of hierarchy from the one previously selected. This is illustrated by decision step 716.

If there is no lower level of hierarchy, the process continues at step 720. In step 720 the navigator zooms in (either smoothly or in a jump) closer to the object. In one embodiment, the navigator zooms to close one-half the distance between the camera and the object. Other zoom distances may be chosen. This process continues each time the user selects to seek that object as illustrated by flow line 762. In one embodiment, the navigator recognizes where on the object the user has clicked.

If the user clicks off center the navigator seeks to the portion of the object clicked on by the user. For example, if the user is at pencil 608 and clicks on a portion of the pencil near the eraser, the navigator seeks closer to the pencil, and centers on or near the portion near the eraser.

If no subsequent seek command is entered for that object, the seek operation is completed. The user may continue navigating, enter another seek command, or select the object to follow its link.

If it is determined in decision step 716 that there is a lower level of hierarchy, the navigator seeks the object at that level. In one embodiment, the particular object sought at that hierarchical level is determined by the proximity of the pointing device click to the objects at that level. For example consider castle 504. If the user first seeks castle 504, then clicks on wing 508A, navigator seeks wing 508A. In one embodiment, navigator zooms in on wing 508A such that it covers 75% of the screen.

If the user clicks on the object again, the process continues at decision step 716 as illustrated by flow line 766 and step 712. If there is a next lower level of hierarchy the object at that level is sought. If not, the navigator zooms on the last selected object. This process continues as the user enters subsequent seek commands on the object. If no subsequent seek command is entered for that object, the seek operation is completed. The user may continue navigating, enter another seek command, or select the object to follow its link.

In one embodiment, the user may skip a level of hierarchy. For example, consider a scenario where the user first seeks castle 504 and is brought to the highest level hierarchy, level zero. If the user can now distinguish the next two levels, levels one and two, this embodiment allows the user to select the level one object (e.g., a wing 508) or the level two object (e.g., a spire 512)

Figure 8:
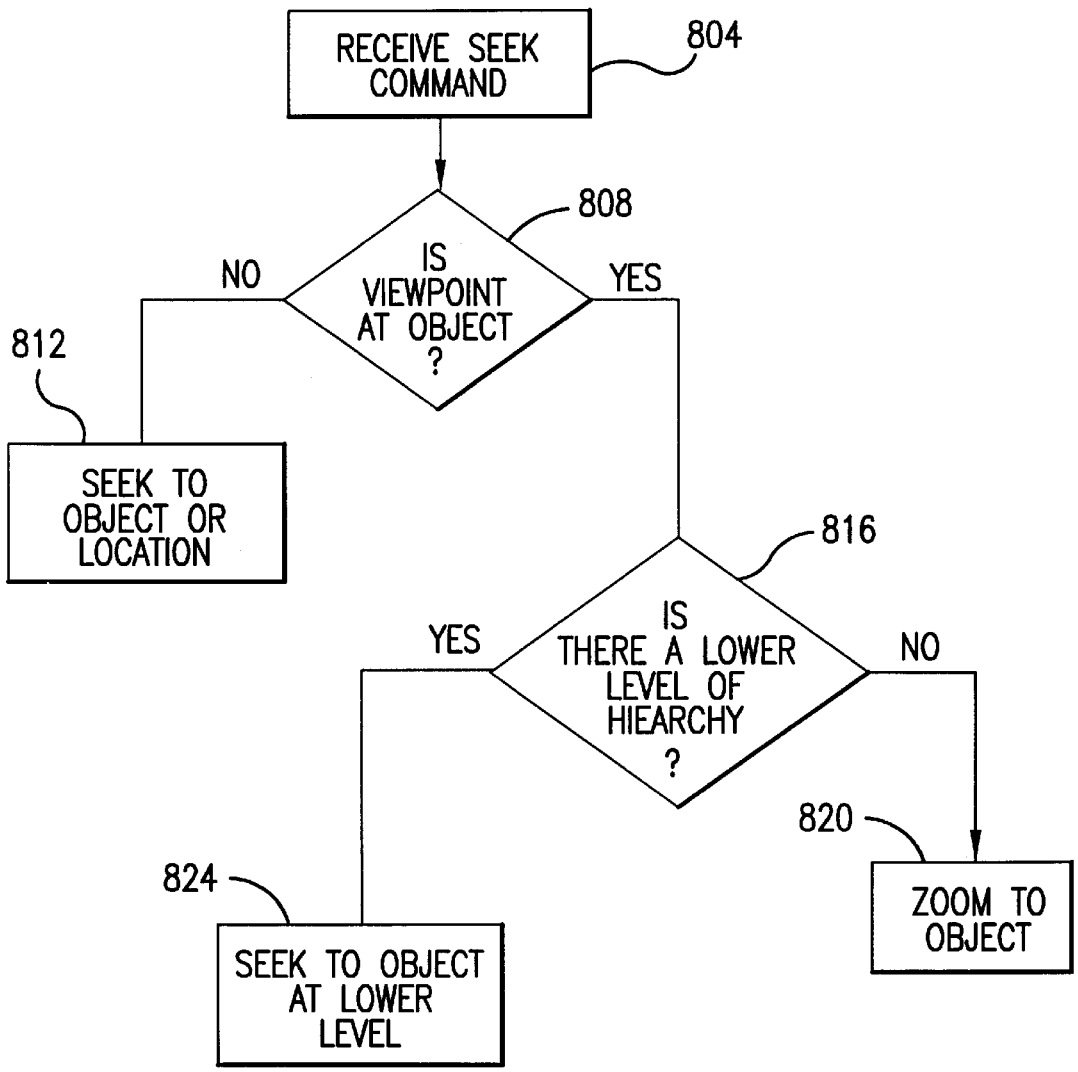
FIG. 8 is a flow diagram illustrating an alternative process by which the navigator seeks objects in a hierarchical embodiment.

One alternative embodiment of the hierarchical seek process is described with reference to FIG. 8. In a step 804, the navigator receives a seek command to seek to an object. For example, the command may tell the navigator to seek to an object such as castle 504. In one embodiment, the seek command is input by the user and recognized by the navigator as described above.

In a step 808, the navigator determines wether the user is already 'at' the object. As described above, in one embodiment, the navigator determines whether the object covers a predetermined area of the screen (e.g., 75%). Alternatively, the navigator can determine whether the user arrived at the object by seeking it. This can be done by looking at the previous seek command.

If the user is not at the object, in a step 812, the navigator seeks to the selected object. To determine whether to seek to the object or to the next level of hierarchy, the navigator first determines whether there is a lower level of hierarchy from the one previously selected. This is illustrated by decision step 816.

If there is no lower level of hierarchy, the process continues at step 820. In step 820 the navigator zooms in closer to the object. This is performed as described above with reference to step 720.

If it is determined in decision step 816 that there is a lower level of hierarchy, the navigator seeks the object at that level as illustrated by a step 824. This operation is performed as described above with reference to step 724.

If the user clicks on the object again, the process returns to step 804. As with the process described with reference to FIG. 7, this process continues as the user enters subsequent seek commands on the object. If no subsequent seek command is entered for that object, the seek operation is completed. The user may continue navigating, enter another seek command, or select the object to follow its link.

The seek processes described herein refer to zooming to a selected object such that the object fills a predetermined percentage of the screen or a predetermined percentage of the height or width of the screen, such as, for example 75%. In one embodiment, the screen percentage filled by an object is based on bounding boxes used to define the object.

In one embodiment, at any given level of hierarchy the object at the next highest level is completely spanned by the object at the given level. In an alternative embodiment, an object is not necessarily spanned by the objects at the next lowest level. In this embodiment, when a user is at an object, the user may seek that object again, or the user may seek an object at the next lowest hierarchy. The navigator responds accordingly by either zooming on the object selected or seeking the selected object at the next level of hierarchy.

In one embodiment, the process of zooming closer to the object at the current level of hierarchy (re-seeking the object) or seeking an object at the next level of hierarchy can only be done after the user has first sought the object. In an alternative embodiment, the navigator can re-seek the object or seek an object at the next level of hierarchy as long as the user is 'at' the object. In one embodiment, the user is 'at' the object when the object fills at least 75% of the screen.

4.4 Examiner Viewer

The examiner viewer allows a user to view an object and rotate or translate that object while the user remains stationary. For example, if the user is viewing a three-dimensional model of a globe, the user can look at Africa and then rotate the globe to look at Australia.

Figure 9:
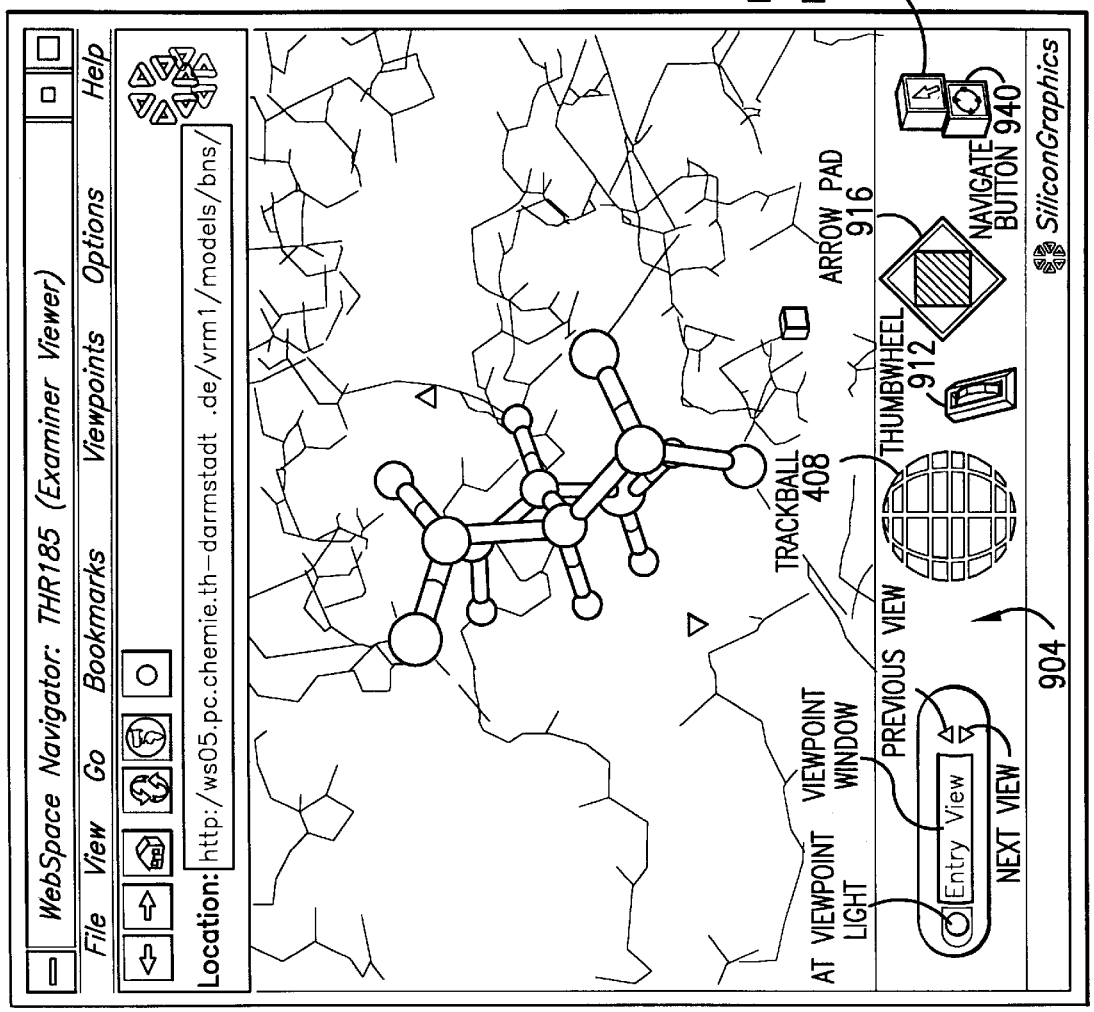
FIG. 9 is a screen view of an examiner viewer according to one embodiment of the invention.

An example view of the examiner viewer is illustrated in FIG. 9. The examiner viewer includes a dashboard control panel 904. Also provided in the embodiment illustrated in FIG. 9 are a menu bar 908, a toolbar 912 and a location field 916.

Dashboard control panel 908 includes a viewpoint control bar 904, a trackball 908, a thumb wheel 912, an arrow pad 916 and a follow links button 936 and a navigate button 940.

In an embodiment where follow links button 936 and navigate button 940 are provided, a cursor mode is entered by clicking navigate button 940. Cursor mode allows the user to rotate and translate the object by click and drag operations with a pointing device. This is similar to the cursor-navigation mode described above with the walk viewer in that the user can click and drag to rotate and zoom the object, seek to selected portions of the object and double click to follow links associated with portions of the object.

Thus, in this mode, the user can utilize travel, seek and select commands without having to change modes of operation. The browser interprets the appropriate commands using a technique similar to that described above with reference to FIG. 4.

Selection of follow links button 236 allows the user to follow a link from a highlighted section of the object (the VRML analogue of an HTML hypertext link) to follow the link associated with that section of the object. Thus, in this mode, single clicks can be used to follow links associated with certain objects.

Trackball 908 allows the user to rotate the object. Rotation of the trackball, for example, by dragging the cursor over the trackball 908, results in a corresponding rotation of the object.

Thumb wheel 912 allows the user to move closer to or farther away from the object. Moving the thumb wheel in one direction causes the object to move away from the user. Accordingly, moving the thumb wheel in the opposite direction causes the object to move closer to the user.

Arrow pad 916 controls the position of the user's viewpoint along the x and y axis.

4.5 Custom Cursor

In one embodiment, the appearance of the cursor changes depending on whether the navigator is in a click-to-follow-links mode (i.e., described above as a single click to follow the link associated with an object), or in the cursor-navigation mode.

4.6 Shortcut Keystrokes

In one embodiment, shortcut keystrokes are provided to allow the user to navigate through a world and to select modes without using the pointing device. Tables 1, 2 and 3 provide a list of keyboard shortcuts for navigator menu commands walk viewer commands and examiner viewer commands, respectively, according to one embodiment of the invention.

TABLE 1

| Command | Keyboard Shortcut |
|---|---|
| "Open Location . . . " | <Ctrl>+L |
| "Open File . . . " | <Ctrl>+O |
| "Exit" | <Ctrl>+Q |
| "Reload" | <Ctrl>+R |
| "Travel Faster" | <Ctrl>+U |
| "Travel Slower" | <Ctrl>+J |
| "Examiner Viewer" | <Ctrl>+E |
| "Walk Viewer" | <Ctrl>+K |
| "Back" | <Ctrl>+Page Up |
| "Forward" | <Ctrl>+Page Down |
| "Stop Loading" | <Esc> |
| "View History" | <Ctrl>+H |
| "Add Bookmark" | <Ctrl>+A |
| "View Bookmarks" | <Ctrl>+B |
| "Help" | F1 |

TABLE 2

| Action | Keyboard Shortcut | 3-Button Pointing Device Shortcut [1-Button Pointing Device Shortcut] |
|---|---|---|
| Move forward or back | Arrow keys | <Alt>+LMB |
| Turn left or right | | [<Alt>+LMB] |
| Sidle left or right | <Alt>+arrow keys | <Alt>+LMB |
| Move camera up or down | | [<Ctrl>+LMB] |
| Tilt up or down | <Ctrl>+arrow keys | <Alt>+LMB+MMB |
| Turn left or right (look around) | | [<Ctrl>+<Alt>+LMB] |
| Navigate to a target point | Not available | <Alt>+click LMB |
| Follow a link | Not available | double click LMB in Navigate mode single click LMB in Follow Link mode |
| Go to previous viewpoint | Page Up | Not available |
| Go to next viewpoint | Page Down | Not available |

TABLE 3

| Action | Keyboard Shortcut | 3-Button Pointing Device Shortcut [1-Button Pointing Device Shortcut] |
|---|---|---|
| Rotate or tumble | Arrow keys | <Alt>+LMB [<Alt>+LMB] |
| Pan (slide camera) | <Alt>+arrow keys | <Alt>+LMB [<Ctrl>+LMB] |
| Move toward/away (dolly) | <Ctrl>+up or down arrow | <Alt>+LMB+MMB [<Ctrl>+<Alt>+LMB] |
| Navigate to a target point | Not available | <Alt>+click LMB |
| Follow a link | Not available | double click LMB in Navigate mode single click LMB in Follow Link mode |
| Go to previous viewpoint | Page Up | Not available |
| Go to next viewpoint | Page Down | Not available |

In one embodiment, a view source window is provided that shows a title and location of VRML file and its URL. The data in this window can be copied and pasted into other directories, files or windows as needed by the user. Additionally, the file itself can be saved into a directory or onto a disk as specified by the user.

4.7 Viewer Commands

In one embodiment, several commands are provided which allow the user to customize the navigator and it's features. These commands allow the user to view the world at different levels of detail and choose different viewing speeds.

A Reload Command allows the user to reload a previously loaded world. A Full Detail command renders the world at the highest level of detail specified by the author. A No Textures command renders the scene without any textures. This may allow the scene to be rendered more quickly and is therefore useful for scenes that are more complicated than the user's machine can comfortably handle.

A Low Detail command renders the scene at a low level of detail without textures. Scenes often render more quickly at a lower level of detail. A Headlight command illuminates the scene form the point at which the user is viewing the world. The headlight moves as the user changes his or her viewing location or directions.

Travel Faster, Travel at Default Speed and Travel Slower commands allow the user to select a speed at which she or he prefers to move around the world.

Walk Viewer and Examiner Viewer commands allow the user to toggle between the walk viewer and examiner viewer modes of operation.

4.8 Go To Commands

In one embodiment, the navigator maintains a list of worlds that are visited by the user in a current session. Additionally, other lists can be maintained through the use of bookmarks or other techniques. The user can use Back, Forward, Home and Stop Loading commands from a menu or a toolbar to select worlds from these lists.

A View History command opens a window that lists a history of locations of the worlds visited by the user. Alternatively, the window displays a list of locations otherwise compiled either by user-specified bookmarks or other techniques. The user simply selects a scene he or she desires to visit (for example, by clicking on the scene name or icon with the pointing device) to go to that scene. In one embodiment a Go To button is provided to press after the scene is selected.

Bookmarks commands allow the user to add, remove and select three-dimensional world locations to his or her browser's bookmarks.

4.9 User Preferences

Several commands are provided that allow the user to customize the navigator to meet desired preferences. Some of the preferences choices which may be included in the three-dimensional navigator are now described.

The user can specify a chosen URL as his or her Home Scene. The Home Scene is the scene or world which is automatically loaded when the user enters the navigator.

The user can specify a temporary directory location where he or she would like the navigator to store temporary files fetched or downloaded from the network.

The user can also specify the machine name and port number of the firewall bypass software proxy server and the HTTP (hypertext transport protocol) proxy server.

In one embodiment, the user can specify the characteristics of the viewer. If the user prefers, he or she can hide the dashboard controls. The user can also specify whether objects with inks are always highlighted or only highlighted when the cursor passes over the object. Additionally, a toolbar having buttons for frequently used commands or functions can be displayed, edited or hidden.

A location field can be provided that allows the user to see the location of the current scene or world being viewed by the user.

4.10 Motion Commands

In one embodiment, the user can select image quality and motion smoothness. In a preferred embodiment, smooth motion is the default motion type. During moves, the navigator may remove some of the scene detail so that the scene can be rendered at a faster frame rate. When motion ceases, the scene is rendered at fill detail. Because a faster frame rate is achievable, this may result in a smoother motion, depending on the rate of motion and the level of detail in the scene being rendered.

If the motion is not as smooth as the user desires, the user may select a smoother motion. This results in parts of the scene disappearing during motion. As a result, the scene can be rendered at a faster frame rate.

Alternatively, the user can select a jump mode which jumps directly to the selected point (destination) in the world instead of moving the user through the world to the destination.

Figure 10:
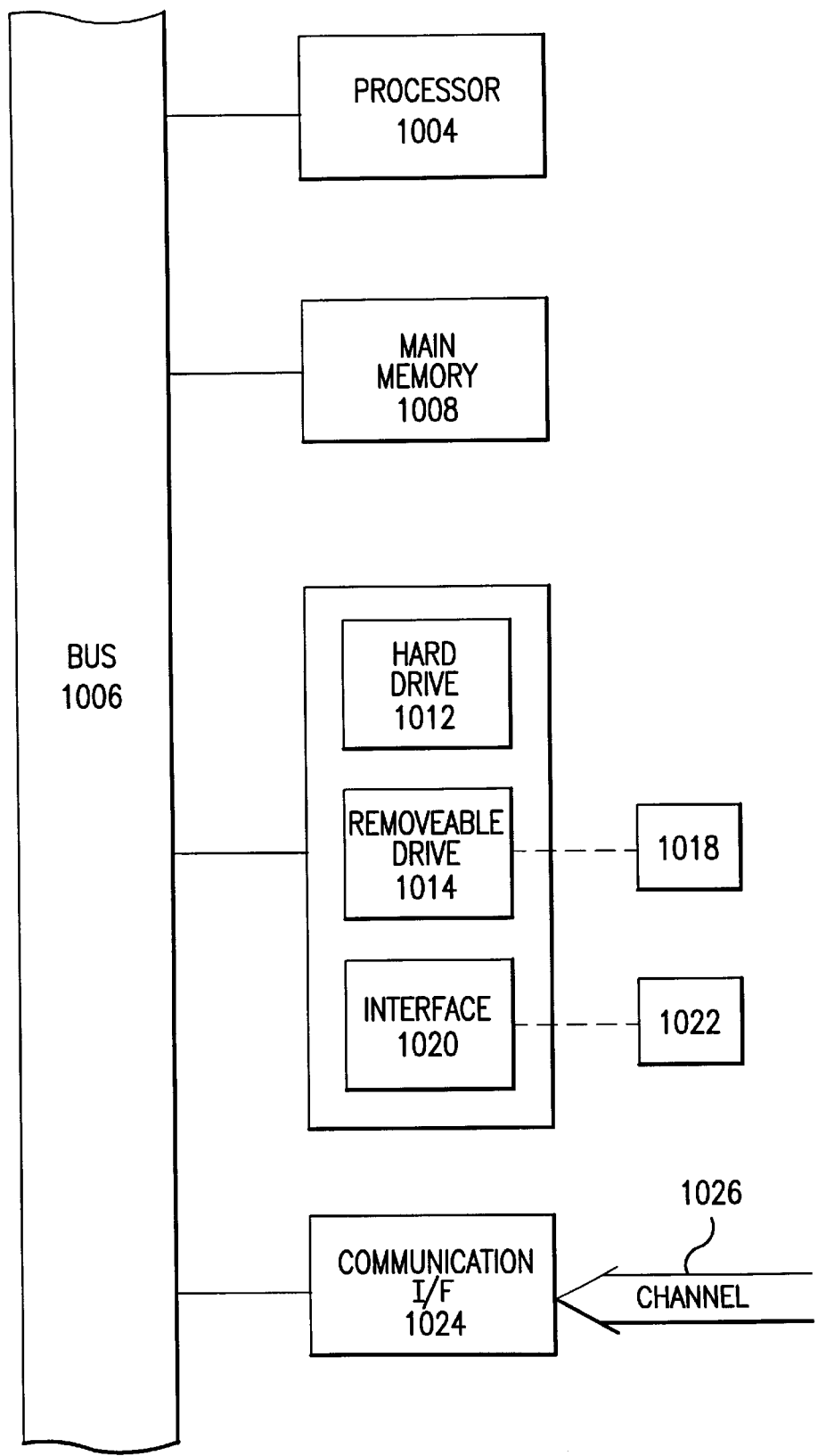
FIG. 10 is a diagram illustrating an example computer system on which the present invention operates according to one embodiment of the invention.

As stated above, the invention may be implemented using hardware, software or a combination thereof and may be implemented in a computer system, work station or other processing system. In fact, in one embodiment, the invention is directed toward computer software capable of directing a computer system to carry out the functionality described herein. An example computer system 1002 is shown in FIG. 10. The computer system 1002 includes one or more processors, such as processor 1004. The processor 1004 is connected to a communication bus 1006. Various software embodiments are described in terms of this example computer system. After reading this description, it will become apparent to a person skilled in the relevant art how to implement the invention using other computer systems and/or computer architectures.

Computer system 1002 also includes a main memory 1008, preferably random access memory (RAM), and can also include a secondary memory 1010. The secondary memory 1010 can include, for example, a hard disk drive 1012 and/or a removable storage drive 1014, representing a floppy disk drive, a magnetic tape drive, an optical disk drive, etc. The removable storage drive 1014 reads from and/or writes to a removable storage unit 1018 in a well known manner. Removable storage unit 1018, represents a floppy disk, magnetic tape, optical disk, etc. which is read by and written to by removable storage drive 1014. As will be appreciated, the removable storage unit 1018 includes a computer usable storage medium having stored therein computer software and/or data.

In alternative embodiments, secondary memory 1010 may include other similar means for allowing computer programs or other instructions to be loaded into computer system 1002. Such means can include, for example, a removable storage unit 1022 and an interface 1020. Examples of such can include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1018 to computer system 1002.

Computer system 1002 can also include a communications interface 1024. Communications interface 1024 allows software and data to be transferred between computer system 1002 and external devices. Examples of communications interface 1024 can include a modem, a network interface (such as an Ethernet card), a communications port, a PCMCIA slot and card, etc. Software and data transferred via communications interface 1024 are in the form of signals which can be electronic, electromagnetic, optical or other signals capable of being received by communications interface 1024. These signals 626 are provided to communications interface via a channel 1028. This channel 1028 carries signals 626 and can be implemented using wire or cable, fiber optics, a phone line, a cellular phone link, an RF link and other communications channels.

In this document, the terms "computer program medium" and "computer usable medium" are used to generally refer to media such as removable storage device 1018, a hard disk installed in hard disk drive 1012, and signals 626. These computer program products are means for providing software to computer system 1002.

Computer programs (also called computer control logic) are stored in main memory and/or secondary memory 1010. Computer programs can also be received via communications interface 1024. Such computer programs, when executed, enable the computer system 1002 to perform the features of the present invention as discussed herein. In particular, the computer programs, when executed, enable the processor 1004 to perform the features of the present invention. Accordingly, such computer programs represent controllers of the computer system 1002.

In an embodiment where the invention is implement using software, the software may be stored in a computer program product and loaded into computer system 1002 using removable storage drive 1014, hard drive 1012 or communications interface 1024. The control logic (software), when executed by the processor 1004, causes the processor 1004 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

5. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

We claim:

1. A browser for allowing a user to navigate in a three-dimensional world having a plurality of objects, where one or more of the plurality of objects has a link to associated data, said browser comprising:

means for differentiating between a seek command, a select command and a travel command entered by the user via a pointing device;

means for moving a viewpoint of the user in the world in response to one of said seek command, said select command and said travel command, said means for moving comprising means for moving said viewpoint to a location indicated by a position of a cursor in the world when said seek command is entered, means for moving said viewpoint in response to movement of the cursor in the world when said travel command is entered, and means for following one or more links associated with a selected object to retrieve associated data when said select command is entered.

2. The browser of claim 1, wherein said means for differentiating between a seek command, a select command and a travel command comprises:

means for accepting button inputs from a pointing device; and means for differentiating between single click, double click and a click and drag operations on said pointing device.

3. The browser of claim 1, wherein said means for moving said viewpoint in response to movement of the cursor in the world comprises means for turning said viewpoint left and right in response to left and right cursor motions and moving said viewpoint forward and backward in the world in response to up and down cursor motions, such that the user appears to travel throughout the world.

4. The browser of claim 1, wherein said means for moving said viewpoint to a location indicated by a position of a cursor in the world comprises means for moving said viewpoint to an object pointed to by the cursor.

5. The browser of claim 4, wherein said means for moving said viewpoint to an object pointed to by the cursor comprises:

means for determining whether said viewpoint is already at said object pointed to by the cursor;

means for determining whether a said object pointed to by the cursor has a lower level of hierarchy;

means for seeking said lower level of hierarchy.

6. The browser of claim 1, wherein said means for following one or more links associated with a selected object comprises means for retrieving data via a VRML link associated with the object.

7. The browser of claim 1, further comprising:

means for identifying an examine command; and means for examining one of said plurality of objects when said examine command is entered.

8. The browser of claim 7, wherein said means for examining further includes means for rotating said one of said plurality of objects in response to user input.

9. The browser of claim 8, wherein said one of said plurality of objects includes more than one portion, wherein each portion has a link to associated data, and wherein said browser further comprises:

means for selecting a portion of said one of said plurality of objects; and means for following a link associated with said selected portion to retrieve associated data when said select command is entered.

10. The browser of claim 7, wherein said means for examining further includes means for moving said viewpoint left and right and moving said view point up and down in the world in response to further user inputs.

11. A method of allowing a user to navigate in a three-dimensional world having a plurality of objects, where one or more of the plurality of objects has a link to associated data, said method comprising the steps of:

differentiating between a seek command, a select command and a travel command entered by the user via a pointing device; and moving a viewpoint of the user in the world in response to one of said seek command, said select command and said travel command, said step of moving comprising one or more of the following steps of moving said viewpoint to a location indicated by a position of a cursor in the world in response to a seek command, moving said viewpoint in response to movement of the cursor in the world in response to a travel command, and following one or more links associated with a selected object to retrieve associated data when said select command is entered.

12. The method of claim 11, wherein said step of differentiating between a seek command, a select command and a travel command comprises the steps of:

accepting button inputs from a pointing device; and differentiating between single click, double click and a click and drag operations on said pointing device.

13. The method of claim 11, wherein said step of moving said viewpoint in response to movement of the cursor in the world comprises a step of turning said viewpoint left and right in response to left and right cursor motions and moving said viewpoint forward and backward in the world in response to up and down cursor motions, such that the user appears to travel throughout the world.

14. The method of claim 11, wherein said step of moving said viewpoint to a location indicated by a position of a cursor in the world comprises means for moving said viewpoint to an object pointed to by the cursor.

15. The method of claim 14, wherein said step of moving said viewpoint to an object pointed to by the cursor comprises the steps of:

determining whether said viewpoint is already at said object pointed to by the cursor;

determining whether a said object pointed to by the cursor has a lower level of hierarchy; and seeking said lower level of hierarchy if said object pointed to by the cursor has a lower level of hierarchy.

16. The method of claim 15, wherein said step of following one or more links associated with a selected object comprises the step of retrieving data associated with a VRML link.

17. The method of claim 11, further comprising the steps of:

receiving an examine command; and examining one of said plurality of objects when said examine command is received.

18. The method of claim 17, wherein said step of examining comprises a step of rotating said one of said plurality of objects in response to user input.

19. The method of claim 18, wherein said one of said plurality of objects includes more than one portion, wherein each portion has a link to associated data, and wherein said method further comprises the steps of:

selecting a portion of said one of said plurality of objects; and following a link associated with said selected portion to retrieve associated data when said select command is entered.

20. The method of claim 17, wherein said step of examining further includes a step of moving said viewpoint left and right and moving said view point up and down in the world in response to further user inputs.

21. A computer program product for use with a computer system, said computer program product comprising:

a computer usable medium having computer readable program code means embodied in said medium for causing the computer system to allow a user to navigate in a three-dimensional world having a plurality of objects, where one or more of the plurality of objects has a link to associated data, said computer readable program code means comprising:

computer readable program code means for differentiating between a seek command, a select command and a travel command entered by the user via a pointing device; and computer readable program code means for moving a viewpoint of the user in the world in response to one of said seek command, said select command and said travel command, said computer readable program code means for moving comprising:

computer readable program code means for moving said viewpoint to a location indicated by a position of a cursor in the world when said seek command is entered, computer readable program code means for moving said viewpoint in response to movement of the cursor in the world when said travel command is entered, and computer readable program code means for following one or more links associated with a selected object to retrieve associated data when said select command is entered.

22. The computer program product according to claim 21, wherein said computer readable program code means for differentiating between a seek command, a select command and a travel command comprises:

computer readable program code means for accepting button inputs from a pointing device; and computer readable program code means for differentiating between single click, double click and a click and drag operations on said pointing device.

23. The computer program product according to claim 21, wherein said computer readable program code means for moving said viewpoint in response to movement of the cursor in the world:

computer readable program code means for turning said viewpoint left and right in response to left and right cursor motions; and computer readable program code means for moving said viewpoint forward and backward in the world in response to up and down cursor motions;

wherein as a result of such motion, the user appears to travel throughout the world.

24. The computer program product according to claim 21, wherein said computer readable program code means for moving said viewpoint to a location indicated by a position of a cursor in the world comprises computer readable program code means for moving said viewpoint to an object pointed to by the cursor.

25. The computer program product according to claim 24, wherein said computer readable program code means for moving said viewpoint to an object pointed to by the cursor comprises:

computer readable program code means for determining whether said viewpoint is already at said object pointed to by the cursor;

computer readable program code means for determining whether a said object pointed to by the cursor has a lower level of hierarchy; and computer readable program code means for seeking said lower level of hierarchy.

26. The computer program product according to claim 21, further comprising:

computer readable program code means for receiving an examine command; and computer readable program code means for examining one of said plurality of objects when said examine command is received.

27. The computer program product according to claim 26, wherein said computer readable program code means for examining further includes computer readable program code means for rotating said one of said plurality of objects in response to user input.

28. The computer program product according to claim 27, wherein said one of said plurality of objects includes more than one portion, wherein each portion has a link to associated data, and wherein said computer program product further comprises:

computer readable program code means for selecting a portion of said one of said plurality of objects; and computer readable program code means for following a link associated with said selected portion to retrieve associated data when said select command is entered.

29. The computer program product according to claim 26, wherein said computer readable program code means for examining further includes a computer readable program code means for moving said viewpoint left and right and moving said view point up and down in the world in response to further user inputs.

30. A computer program medium readable by a machine, tangibly embodying a program of instructions executable by the machine to perform method steps for allowing a user to navigate in a three-dimensional world having a plurality of objects, where one or more of the plurality of objects has a link to associated data, said method comprising the steps of:

differentiating between a seek command, a select command and a travel command entered by the user via a pointing device; and moving a viewpoint of the user in the world in response to one of said seek command, said select command and said travel command, said step of moving comprising one or more of the following steps of moving said viewpoint to a location indicated by a position of a cursor in the world in response to a seek command, moving said viewpoint in response to movement of the cursor in the world in response to a travel command, and following one or more links associated with a selected object to retrieve associated data when said select command is entered.

31. The computer program medium according to claim 30, wherein said step of differentiating between a seek command, a select command and a travel command comprises the steps of:

accepting button inputs from a pointing device; and differentiating between single click, double click and a click and drag operations on said pointing device.

32. The computer program medium according to claim 30, wherein said step of moving said viewpoint in response to movement of the cursor in the world comprises a step of turning said viewpoint left and right in response to left and right cursor motions and moving said viewpoint forward and backward in the world in response to up and down cursor motions, such that the user appears to travel throughout the world.

33. The computer program medium according to claim 30, wherein said step of moving said viewpoint to a location indicated by a position of a cursor in the world comprises means for moving said viewpoint to an object pointed to by the cursor.

34. The computer program medium according to claim 33, wherein said step of moving said viewpoint to an object pointed to by the cursor comprises the steps of:

determining whether said viewpoint is already at said object pointed to by the cursor;

determining whether a said object pointed to by the cursor has a lower level of hierarchy; and seeking said lower level of hierarchy if said object pointed to by the cursor has a lower level of hierarchy.

35. The computer program medium according to claim 34, wherein said step of following one or more links associated with a selected object comprises the step of retrieving data associated with a VRML link.

36. The computer program medium according to claim 30, further comprising the steps of:

receiving an examine command; and examining one of said plurality of objects when said examine command is received.

37. The computer program medium according to claim 36, wherein said step of examining comprises a step of rotating said one of said plurality of objects in response to user input.

38. The computer program medium according to claim 37, wherein said one of said plurality of objects includes more than one portion, wherein each portion has a link to associated data, and wherein said method further comprises the steps of:

selecting a portion of said one of said plurality of objects; and following a link associated with said selected portion to retrieve associated data when said select command is entered.

39. The computer program medium according to claim 36, wherein said step of examining further includes a step of moving said viewpoint left and right and moving said view point up and down in the world in response to further user inputs.

* * * * *